US011082146B2

(12) United States Patent
Bleck

(10) Patent No.: US 11,082,146 B2
(45) Date of Patent: Aug. 3, 2021

(54) METHOD AND APPARATUS FOR EFFICIENT UTILIZATION OF A TRANSPORT CAPACITY PROVIDED BY AN OPTICAL TRANSPORT NETWORK

(71) Applicant: ADVA Optical Networking SE, Meiningen OT Dreissigacker (DE)

(72) Inventor: Oliver Bleck, Geretsried (DE)

(73) Assignee: ADVA OPTICAL NETWORKING SE, Meiningen Ot Dreissigacker (DE)

( * ) Notice: Subject to any disclaimer, the term of this patent is extended or adjusted under 35 U.S.C. 154(b) by 0 days.

(21) Appl. No.: 16/782,656

(22) Filed: Feb. 5, 2020

(65) Prior Publication Data
US 2020/0259582 A1   Aug. 13, 2020

(30) Foreign Application Priority Data
Feb. 7, 2019   (EP) .................................... 19156006

(51) Int. Cl.
*H04J 14/00*   (2006.01)
*H04J 14/02*   (2006.01)
(Continued)

(52) U.S. Cl.
CPC .......... *H04J 14/0227* (2013.01); *H04B 10/25* (2013.01); *H04B 10/27* (2013.01)

(58) Field of Classification Search
CPC ...... H04J 14/02; H04J 14/0227; H04J 3/1652; H04J 3/1658; H04J 3/0658; H04J 3/0691;
(Continued)

(56) References Cited

U.S. PATENT DOCUMENTS

2003/0048813 A1*   3/2003   Lahav ..................... H04J 3/167
                                                            370/537
2012/0269511 A1   10/2012   Calderon et al.
2018/0375604 A1*  12/2018   Su ........................ H04Q 11/0062

FOREIGN PATENT DOCUMENTS

EP   2 775 638 A2   9/2014
EP   2 852 177 A1   3/2015
(Continued)

OTHER PUBLICATIONS

Communication of the Extended European Search Report for European Patent Application Serial No. 19156006.9 (dated Jul. 25, 2019).
(Continued)

*Primary Examiner* — Hanh Phan
(74) *Attorney, Agent, or Firm* — Jenkins, Wilson, Taylor & Hunt, P.A.

(57) ABSTRACT

A method for efficient utilization of a transport capacity provided by an optical transport network includes mapping client signals comprising lower order optical data units into optical data tributary units, each requiring a number of tributary slots of an aggregate payload area having a size corresponding to the available aggregated OPU payload areas of Nx independent higher order optical data units to be transported. The method further includes multiplexing the optical data tributary units into the aggregate payload area. The method further includes mapping the tributary slots of the aggregate payload area into tributary slots provided by the OPU payload areas of the Nx independent higher order Optical data units according to a predefined mapping rule. The method further includes multiplexing the Nx independent optical data units containing the payload areas or transmitting them as optical transport units.

14 Claims, 3 Drawing Sheets

(51) Int. Cl.
*H04B 10/25* (2013.01)
*H04B 10/27* (2013.01)

(58) Field of Classification Search
CPC .. H04B 10/27; H04B 10/516; H04Q 11/0067; H04Q 11/0066; H04Q 11/0062
USPC ...... 398/79, 45, 48, 49, 46, 47, 159, 75, 98, 398/135, 136, 58, 43; 370/537, 474, 476, 370/389, 395.43, 535
See application file for complete search history.

(56) References Cited

FOREIGN PATENT DOCUMENTS

EP 2 991 252 A1 3/2016
WO WO 2010/121520 A1 10/2010

OTHER PUBLICATIONS

"Series G: Transmission Systems and Media, Digital Systems and Networks; Series Y: Global Information Infrastructure, Internet Protocol Aspects and Next-Generation Networks, Internet of Things and Smart Cities," Telecommunication Standardization Sector of ITU, G.709/Y.1331, pp. 1-244 (Jun. 2016).

* cited by examiner

METHOD AND APPARATUS FOR EFFICIENT UTILIZATION OF A TRANSPORT CAPACITY PROVIDED BY AN OPTICAL TRANSPORT NETWORK

PRIORITY CLAIM

This application claims the priority benefit of European Patent Application Serial No. 19156006.9 filed Feb. 7, 2019, the disclosure of which is incorporated herein by reference in its entirety.

TECHNICAL FIELD

The invention relates to a method and apparatus for efficient utilization of a transport capacity provided by an Optical Transport Network OTN and in particular to a method and apparatus to multiplex Lower Order, LO, Optical Data Units, ODUk, signals into multiple Higher Order, HO, ODU signals which may be independently transported by means of an adapted OTN multiplex structure.

TECHNICAL BACKGROUND

An Optical Transport Network OTN comprises optical network elements connected by optical fiber links. An Optical Transport Network OTN provides the functionality of transport, multiplexing, switching, management and supervision of optical channels carrying client signals. The Optical Transport Network OTN provides support for optical networking using wavelength division multiplexing WDM. The OTN signal incorporates overhead optimized for transporting signals over carrier WDM networks. Client signals can be carried over the Optical Transport Network OTN in a transparent manner. The transport of a non-OTN client signal in an OTN network starts with the client signal being mapped into the Optical Payload Unit (OPU) of an Optical Data Unit (ODU). The overhead associated with the OPU payload contains information to support the adaption process of the client signal. The overhead associated with the ODU provides means for end-to-end supervision and tandem connection monitoring. The Optical Data Unit, ODU, can either be mapped into an Optical Transport Unit, OTU, or be further multiplexed into another Higher Order Optical Data Unit, HO ODU. The Optical Transport Unit OTU can be transported utilizing one or multiple optical wavelengths of the OTN grid. Multiple optical wavelengths can be multiplexed to be transported over optical fiber links.

While supporting transport of multiple ODU signals, a conventional mechanism applied in a conventional OTN network may not be capable to transport some non-OTN client signals in a bandwidth efficient way, e.g. 32G Fibre Channel signals.

Accordingly, there is a need to provide a method and apparatus providing a more efficient utilization of a transport capacity provided by an Optical Transport Network OTN for such client signals.

SUMMARY OF THE INVENTION

The invention provides according to a first aspect a method for efficient utilization of a transport capacity provided by an Optical Transport Network OTN wherein the method comprises the steps of:
mapping received client signals comprising Lower Order, LO, Optical Data Units, LO ODU, into Optical Data Tributary Units, ODTU, each requiring a number of Tributary Slots, TS, of an aggregated OPU_N payload area having a size corresponding to the available aggregated OPU payload areas provided by Nx independent Higher Order, HO, Optical Data Units, HO ODU, to be transported;
multiplexing the Optical Data Tributary Units, ODTU, into the aggregated OPU_N payload area;
mapping the Tributary Slots, TS, of the aggregated OPU_N payload area into Tributary Slots, TS, provided by the payload areas of the multiple independent Higher Order, HO, Optical Data Units, HO ODUk, according to a predefined mapping rule, MR; and
further multiplexing the Optical Data Units, ODU, containing the payload areas or transmitting them as Optical Transport Units, OTU.

In a possible embodiment of the method according to the first aspect of the present invention, the Lower Order, LO, Optical Data Units, LO ODU, are mapped into Optical Data Tributary Units, ODTU, by an asynchronous mapping procedure.

In a further possible embodiment of the method according to the first aspect of the present invention, the predefined mapping rule, MR, indicates a mapping between Tributary Slots, TS, of the aggregated OPU_N payload area and Tributary Slots, TS, of the bonded OPU payload areas provided by multiple independent Optical Data Units, ODU.

In a further possible embodiment of the method according to the first aspect of the present invention, the predefined mapping rule, MR, indicates a mapping as follows:

$$TS(A,B) \leftrightarrow TS(B)@ODUk(A)$$

wherein A is an OPU payload identifier, OID, identifying the OPU payload of an individual Optical Data Unit, ODU, from a set of available Optical Data Units, ODU, and
B is a tributary slot number of an available Tributary Slot, TS, provided by the OPU payload of the individual Optical Data Unit, ODU.

The invention provides according to this further aspect a method for efficient utilization of a transport capacity provided by an Optical Transport Network, OTN, the method comprising the steps of:
extracting payload areas of multiple independent Optical Data Units, ODU;
deskewing the extracted payload areas of the multiple independent Optical Data Units, ODU, to compensate differential transport delays;
demapping of Tributary Slots, TS, of an aggregated OPU_N payload area from the Tributary Slots, TS, provided by the deskewed OPU payloads of the independent Optical Data Units, ODU;
demultiplexing Optical Data Tributary Units, ODTU from the aggregated OPU_N payload area; and
demapping Lower Order, LO, Optical Data Units, LO ODUk, transmitted as client signals from the Optical Data Tributary Units, ODTU.

In a possible embodiment of the method according to the second aspect of the present invention, the deskewing of the extracted OPU payloads of the independent Optical Data Units, ODU, is performed by using a round robin deskewing counter.

In a still further possible embodiment of the method according to the second aspect of the present invention, the round robin deskewing counter comprises an OPU payload alignment counter.

The invention provides according to a further aspect an Optical Transport Network, OTN, apparatus comprising the features of claim 8.

The invention provides according to this further aspect an Optical Transport Network, OTN, apparatus comprising:
a first mapping unit adapted to map received client signals comprising Lower Order, LO, Optical Data Units, LO ODU, into Optical Data Tributary Units, ODTU, associated with a number of Tributary Slots, TS, of an aggregated OPU_N payload area having a size corresponding to available aggregated OPU payload areas of multiple, N, independent Higher Order, HO, Optical Data Units, HO ODU, to be transported;
a multiplexing unit adapted to multiplex the Optical Data Tributary Units, ODTU, into the aggregated OPU_N payload area;
a second mapping unit adapted to map the Tributary Slots, TS, of the aggregated OPU_N payload area into Tributary Slots, TS, provided by the OPU payload areas of the multiple, N, independent Higher Order, HO, Optical Data Units, HO ODU, according to a predefined mapping rule, MR;
wherein the Optical Data Units, ODU, are either further multiplexed by said multiplexing unit or transmitted by a transmitter unit as Optical Transport Units, OTU.

In a possible embodiment of the Optical Transport Network, OTN, apparatus, the apparatus further comprises an extraction and deskewing unit adapted to extract he OPU payload areas of multiple independent Optical Data Units, ODU, and to deskew the extracted OPU payload areas of the Optical Data Units, ODU, to compensate differential transport delays.

In a further possible embodiment of the Optical Transport Network, OTN, the apparatus further comprises a first demapping unit adapted to demap Tributary Slots, TS, of an aggregated OPU_N payload area from the Tributary Slots, TS, provided by the deskewed OPU payload areas of the independent Optical Data Units, ODU.

In a further possible embodiment of the Optical Transport Network, OTN, apparatus, the apparatus further comprises a demultiplexing unit adapted to demultiplex the Optical Data Tributary Units, ODTU from the aggregated OPU_N payload area.

In a further possible embodiment of the Optical Transport Network, OTN, apparatus, the apparatus comprises a second demapping unit adapted to demap Lower Order, LO, Optical Data Units, LO ODU, transmitted as client signals from the Optical Data Tributary Units, ODTU.

In a further possible embodiment of the Optical Transport Network, OTN, apparatus, the extraction and deskewing unit is adapted to deskew the extracted OPU payload areas of the multiple independent Optical Data Units, ODU, using a round robin deskewing counter.

In a further possible embodiment of the Optical Transport Network, OTN, apparatus, the round robin deskewing counter comprises an MFAS counter or an OPU payload alignment counter generating a counter value transported in the overhead associated with the OPU payload area.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
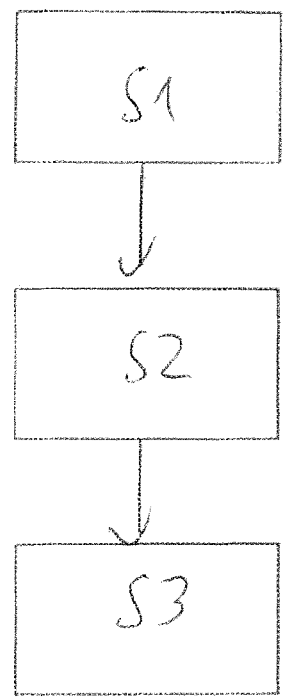
FIG. 1 shows a flowchart of a possible exemplary embodiment of a method for efficient utilization of a transport capacity provided by an Optical Transport Network, OTN, according to an aspect of the present invention.

As can be seen on the flowchart illustrated in FIG. 1, the method for efficient utilization of a transport capacity provided by an Optical Transport Network, OTN, according to an aspect of the present invention can comprise several main steps. In the illustrated exemplary embodiment, the method comprises three main steps S1 to S3.

In a first step S1, received client signals comprising Lower Order, LO, Optical Data Units, LO ODU, are mapped into Optical Data Tributary Units ODTU each requiring a number of Tributary Slots TS of an aggregated OPU_N payload area having a size corresponding to the available aggregated OPU payload areas of Nx independent Higher Order HO Optical Data Units, HO ODU, to be transported in the Optical Transport Network OTN.

In a further step S2, the Optical Data Tributary Units, ODTU, are multiplexed into the aggregated OPU_N payload area.

In a further step S3, Tributary Slots TS of the aggregated OPU_N payload area are mapped into Tributary Slots TS provided by the OPU payload areas of Nx independent Higher Order, HO, Optical Data Units, HO ODUk, according to a predefined mapping rule, MR. The Optical Data Units ODU containing the OPU payload areas are either further multiplexed or transmitted as Optical Transport Units OTU.

Figure 2:
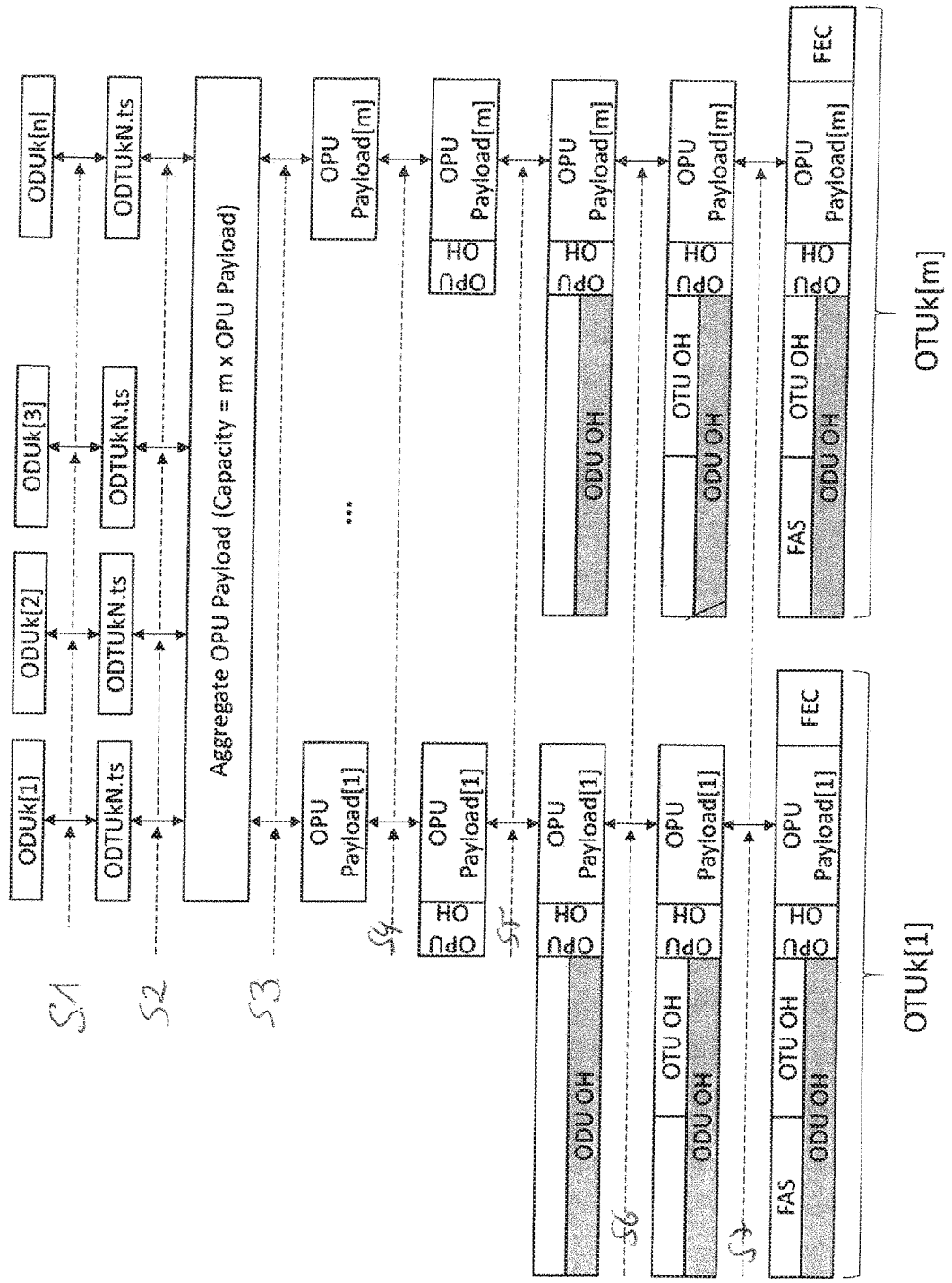
FIG. 2 illustrates the operation of a method and apparatus for efficient utilization of a transport capacity provided by an Optical Transport Network, OTN, according to the present invention.

The method illustrated in FIG. 1 is further illustrated in the schematic diagram of FIG. 2. As can be seen in the schematic diagram of FIG. 2, Lower Order, LO, Optical Data Units, LO ODU, of received client signals are mapped in step S1 into Optical Data Tributary Units ODTU each requiring a number of Tributary Slots TS of an aggregated OPU_N payload area. The mapping procedure applied in step S1 can comprise in a possible embodiment an asynchronous mapping procedure.

Optical Data Tributary Units ODTU are then multiplexed in step S2 into the aggregated OPU_N payload as also illustrated in FIG. 2. The aggregated OPU_N payload has a capacity or size corresponding to the available aggregated OPU payload areas of Nx independent Higher Order, HO, Optical Data Units, HO ODU, to be transported.

The Optical Data Tributary Units ODTU are multiplexed into the aggregated OPU_N payload area as shown in FIG. 2. In the third step S3, the Tributary Slots TS of the aggregated OPU_N payload area are mapped into Tributary Slots TS provided by the payload areas of Nx independent Higher Order, HO, Optical Data Units, HO ODU, according to a predefined mapping rule, MR, as also illustrated in FIG. 2. These Optical Data Units ODU containing the OPU payload areas can then be either further multiplexed or encapsulated into Optical Transport Units OTU as also shown in FIG. 2.

As can be seen in FIG. 2, the Optical Data Unit ODU comprises the OPU payload area and an overhead, OH, associated with the OPU payload area. In a possible embodiment, an MSI, OID, OLID and OPU payload alignment counter can be inserted in step S4 into the overhead OH.

Further, ODU frame generation and ODU overhead insertion can be performed in step S5 as illustrated in the schematic diagram of FIG. 2. Then, the Optical Transport Unit OTU overhead is inserted in step S6 as also illustrated in FIG. 2. Finally, the Frame Alignment Signal FAS and Forward Error Correction, FEC, parity bytes can be inserted in step S7 as illustrated in FIG. 2 to provide the Optical Transport Units OTU as shown in FIG. 2.

The processing steps S1 to S7 illustrated in FIG. 2 can be executed in both directions as also illustrated in FIG. 2. The Optical Transport Units OTU can be processed in several substeps to extract OPU payload areas of multiple independent Optical Data Units ODU, wherein the extracted OPU payload areas of the multiple independent Optical Data Units ODU can be deskewed to compensate for differential transport delays. In a further step, the Tributary Slots TS of the aggregated OPU_N payload area are demapped from the Tributary Slots TS provided by the deskewed OPU payload areas of the multiple independent Optical Data Units ODU. Then, the Optical Data Tributary Units ODTU can be demultiplexed from the aggregated OPU_N payload area as also illustrated in FIG. 2. Finally, the Lower Order LO Optical Data Units LO ODU forming client signals are demapped from the Optical Data Tributary Units ODTU.

In the schematic diagram of FIG. 2, step S1, S2, S3 form the main steps of the method for efficient utilization of a transport capacity provided by an Optical Transport Network OTN according to the present invention. Step S1 comprises an asynchronous mapping/demapping step, step S2 comprises a multiplexing/demultiplexing step and step S3 comprises a further mapping/demapping step. Signal transformations performed in step S4 to S7 can be implemented by standard processes.

Figure 3:
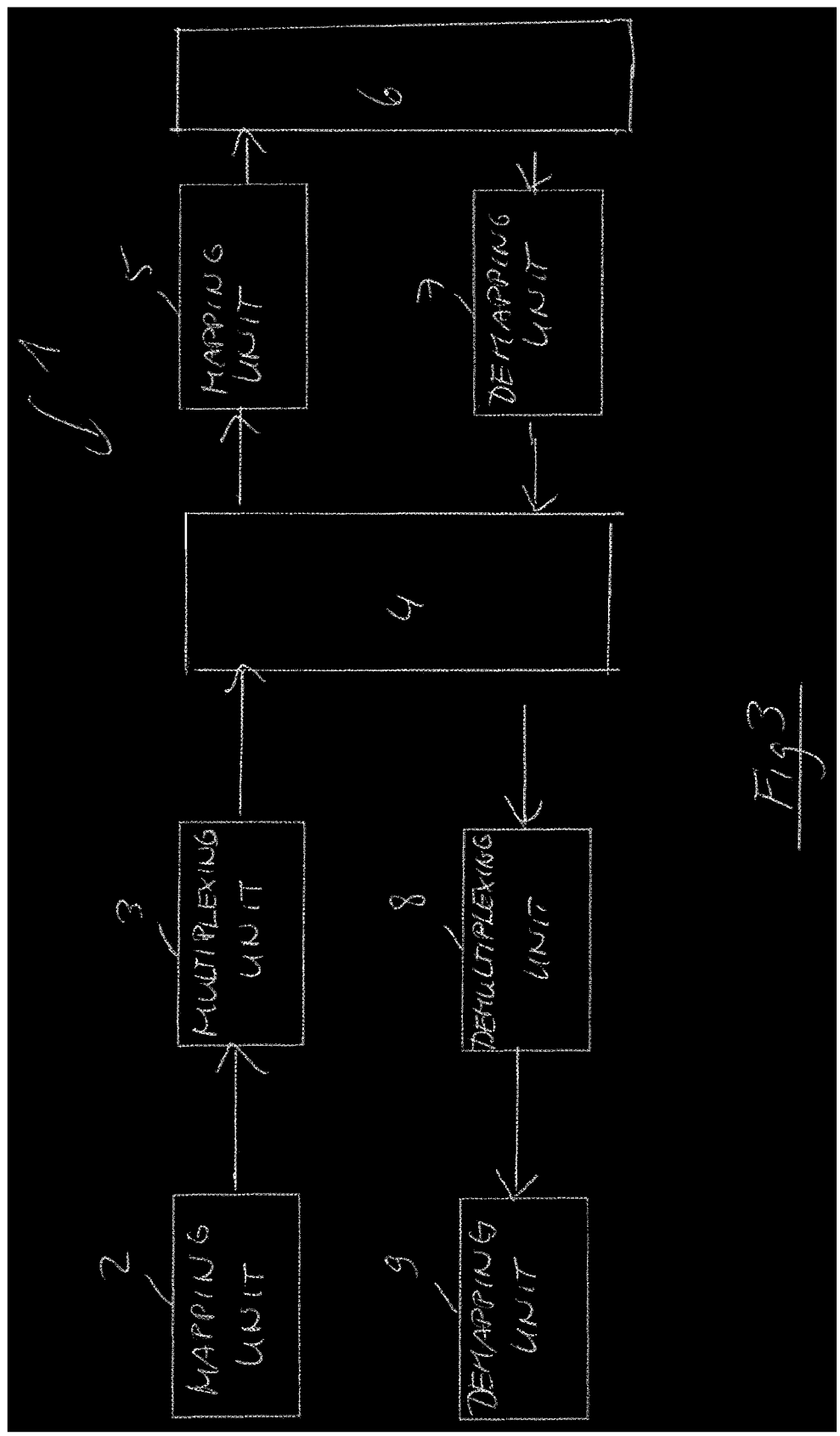
FIG. 3 shows a block diagram for illustrating a possible exemplary embodiment of an Optical Transport Network, OTN, apparatus according to an aspect of the present invention.

FIG. 3 shows a block diagram of a possible exemplary embodiment of an Optical Transport Network, OTN, apparatus 1 according to a further aspect of the present invention. In the illustrated embodiment, the OTN apparatus 1 comprises a first mapping unit 2 adapted to map client signals comprising Lower Order LO Optical Data Units LO ODU into Optical Data Tributary Units ODTU associated with a number of Tributary Slots TS of an aggregated OPU_N payload area having a size corresponding to available aggregated OPU payload areas of Nx independent Higher Order HO Optical Data Units HO ODU to be transported via the network. In the illustrated embodiment of FIG. 3, the Optical Transport Network OTN apparatus 1 comprises a multiplexing unit 3 adapted to multiplex the Optical Data Tributary Units ODTU into the aggregated OPU_N payload area which can be stored temporarily in a corresponding memory 4. The OTN apparatus 1 further comprises a second mapping unit 5 adapted to map the Tributary Slots TS of the aggregated OPU_N payload area into Tributary Slots TS provided by the OPU payload areas of the Nx independent Higher Order HO Optical Data Units HO ODU according to a predefined mapping rule MR. The mapping rule MR must be clearly defined and known to the source (mapping/multiplexing) and the sink (demultiplexing/demapping) and provides an unambiguous association between the Tributary Slots TS of the aggregated OPU_N payload area and the Tributary Slots TS of the multiple OPU payload areas. The mapping rule MR indicates a mapping between Tributary Slots TS of the aggregated OPU_N payload area and tributary slots of the OPU payload areas provided by the Nx independent Optical Data Units ODU. In a possible implementation, the mapping rule MR indicates a mapping as follows:

$$TS(A,B) \leftrightarrow TS(B)@ODUk(A)$$

wherein

A is an OPU payload identifier OID identifying the OPU payload of an individual Optical Data Unit, ODU, from a set of available Optical Data Units ODU and B is a tributary slot number of an available Tributary Slot TS provided by the OPU payload of the individual Optical Data Unit ODU. The Optical Data Units ODU can in a possible embodiment be further multiplexed by the multiplexing unit or further processed to provide Optical Transport Units OTU as illustrated in the schematic diagram of FIG. 2. In the illustrated embodiment of FIG. 3, the apparatus 1 comprises a processing unit 6 adapted to perform the standard processing steps S4, S5, S6, S7 as shown in FIG. 2.

The OTN apparatus 1 comprises in the illustrated embodiment of FIG. 3 a first demapping unit 7 adapted to demap Tributary Slots TS of an aggregated OPU_N payload area from the tributary slots provided by the deskewed OPU payload areas of the Nx independent Optical Data Units ODU. The apparatus 1 further comprises in the illustrated embodiment a demultiplexing unit 8 adapted to demultiplex the Optical Data Tributary Units ODTU from the aggregated OPU_N payload area. The OTN apparatus 1 further comprises a second demapping unit 9 adapted to demap the Lower Order LO Optical Data Units LO ODU forming client signals from the Optical Data Tributary Units ODTU.

In a possible embodiment, the Optical Transport Network OTN apparatus 1 as shown in FIG. 3 comprises an extraction and deskewing unit adapted to extract OPU payload areas of multiple Optical Data Units and to deskew the extracted payload areas of the Optical Data Units ODU to compensate differential transport delays and to supply the first demapping unit 7 with the deskewed OPU payload areas. In a possible implementation, the extraction and deskewing unit can be adapted to deskew the extracted OPU payload areas of the Optical Data Units ODU using a round robin deskewing counter. In a possible implementation, the round robin deskewing counter can comprise an MFAS counter. In an alternative embodiment, the round robin deskewing counter can comprise an OPU payload alignment counter generating a counter value transported in the OPU overhead.

The asynchronous mapping and/or demapping process performed by the mapping unit 2 and/or the demapping unit 9 takes care of a required bridging between clock domains of the LO ODU and the HO ODU. The clock domains are bridged basically by adapting a ratio of data bytes/stuff bytes transported per frame.

With the method and apparatus 1 according to the present invention the OPU payload areas of independent ODU signals are bonded such that they become available as a contiguous OPU_N payload area to an adapted OTN multiplex structure to multiplex ODTU signals. The ODU signals containing the bonded OPU payload areas remain independent and can be transported independently through the OTN network. The method supports the aggregation of LO ODU signals into an aggregate OPU_N payload supported by multiple OTN interfaces. The method can be adapted generically depending on the number of OTN interfaces supported by the respective equipment.

The method and apparatus 1 allow to transport signals with a data rate exceeding the bandwidth capacity of a single OTN interface in cases where OTUCn capable interfaces may not be available or in cases where use of OTU interfaces with bonded OPU payload areas may provide a mapping efficiency benefit compared to OTUCn capable interfaces because of the differences of Tributary Slot, TS, bandwidth. In a possible embodiment, the adapted OTN multiplex structure source function can insert an OPU payload identifier (OID) into the overhead of the bonded OPU payloads unique for each individual bonded OPU payload. In a possible implementation, the OPU payload identifier OID can be assigned to the bonded OPU payloads in a standing order and can be used to define a unique number of the Tributary Slots TS distributed over the multiple bonded OPU payloads to allow TS bundling and/or to multiplex/map the ODTU payload data and the TS overhead TSOH. In a possible embodiment, it can be advantageous to define the OPU payload identifier OID to be inserted into the OPU OH bytes to ensure that any intermediate standard OTN equipment does not alter it. However, the concept does not require to use bytes from the OPU OH, i.e. other byte positions can be used as well.

As the OPU payload identifier is static in nature, it is not necessary that the OID is communicated fast and often. Accordingly, in a possible embodiment, it may be beneficial to insert it into a byte from the payload structure identifier PSI defined as a reserved byte by ITU-T G.709 at frame column *15, frame row *4 of the OPU OH. Further, in a possible embodiment, a value range of the OPU payload identifier OID can be restricted to a predefined value range, e.g. to a value range of 1 to 255, e.g. 0 representing an invalid OID value. Such a restriction allows to identify an OPU payload to be a bonded OPU payload of an aggregate OPU_N payload. In a possible implementation, for an OPU payload not bonded, the value of the reserved byte chosen from the PSI to transport the OID may be chosen to be zero as defined by ITU-T G.709. If at the terminating sink function the accepted OID of the OPU payloads received do not match the expected OPU payload identifier (OID) of the OPU payloads, i.e. do not match to the local bonded OPU payload configuration, a mismatch condition can be determined in a possible embodiment and correlated and/or reported to a management system for defect reporting.

If multiple OPU payload bonding groups are supported by an equipment or device, supporting an OPU payload bonding group ID (OGID) can be provided. A separate reserved byte from the PSI or any other reserved byte can be allocated in a possible embodiment to transport the OPU payload bonding group identifier OGID.

Since it is unlikely that a high amount of OPU payloads need to be bonded or that a high amount of separate OPU payload bonding groups need to be supported by the same network equipment, as an alternative to allocating two bytes, the OPU payload identifier (OID) and the OPU payload bonding group identifier (OGID) can be coded in a possible embodiment to occupy a single reserved byte from the payload structure identifier PSI only.

In a possible embodiment, the adapted OTN multiplex structure sink function retrieves the OPU payload identifier (OID) and the OPU payload bonding group identifier (OGID) from the Optical Payload Unit overhead (OPU OH) of any bonded OPU payload to determine the correct sorting order for ODTU payload data and/or Tributary Slot Overhead, TSOH, retrieval.

To deskew bonded OPU payloads providing an aggregate OPU_N payload, it is necessary to determine a differential delay between each bonded OPU payload at the adapted OTN multiplex structure sink function.

In a possible embodiment, information is defined to be inserted into the OPU OH bytes to ensure that intermediate standard OTN equipment of the network does not alter it. However, the concept does not require to use bytes from the Optical Payload Unit OPU overhead OH, i.e. other byte positions may be used as well.

To deskew bonded OPU payloads, a single round robin deskewing counter increased with each frame of the Optical Data Unit ODU signals transporting the bonded OPU payloads can be used.

The maximum value N supported by the deskewing counter determines the maximum amount of differential delay which may be deskewed. With the deskewing counter providing a unique frame identification for Nx frames of the ODU signals, a maximum differential delay of N/2−1 frame periods of an ODU signal can be removed.

To be able to use the value of the deskewing counter to deskew bonded OPU payloads at the OTN multiplex structure sink function, the value of one deskewing counter is to be inserted by the source function for any bonded OPU payload.

In case that the FS/MFS of all ODU signals are synchronized, the MFAS value derived from the MFS may be used as a deskewing counter as the synchronized MFS does lead to a synchronized MFAS value providing a 0 . . . 255 round robin counter.

An alternative embodiment instead of using the MFAS as a deskewing counter is to insert the value of a dedicated deskewing counter in the Optical Payload Unit OPU overhead OH of each ODU signal transporting a bonded OPU payload.

In case of ODU4 signals, in a possible implementation, it is possible to use the byte at frame column #16/frame row #4 for that purpose. In case of an OTN multiplex structure supporting ODTU4.ts signals, that byte is allocated to carry the OPU multiframe identifier (OMFI). The OPU multiframe identifier OMFI is defined to be a 0 . . . 79 round robin counter to support identification of a frame position within a 80 frame multiframe structure required to be able to insert/retrieve the TSOH at a proper position within the multiframe.

So while that byte's usage is defined, it can be still reused to support the deskewing counter while at the same time supporting the OPU multiframe identifier OMFI.

In case that a 80 frame multiframe structure is maintained, a deskewing counter can be defined to be a 0 . . . 239 round robin counter. Applying a modulo 80 operation to the current value of such a deskewing counter provides the 0 . . . 79 count required for the OPU multiframe identifier OMFI.

If a different multiframe structure is defined to support multiplexing more ODTU signals, the value range of the OPU multiframe identifier OMFI need to be adapted accordingly with the value range of the deskewing counter being adapted as applicable. For example, in case of a 128 frame multiframe period being required, the value range of the OPU multiframe identifier OMFI would be changed to 0 . . . 127 which can be simply derived from a 0 . . . 255 deskewing counter. In an alternative embodiment, the OPU multiframe identifier OMFI may be derived from the MFAS if the MFS has been synchronized.

Alternative deskewing counter value ranges as well as byte positions to transport the deskewing counter are possible in alternative implementations. In case that the concept of OPU payload bonding is applied to OPU2/OPU3 signals, an alternative embodiment to transport the deskewing counter may use that byte at frame column #16/frame row #4 without double use as it is defined being a reserved byte. In ITU-T G.709, the 8 frame/32 frame multiframe period of an OTN multiplex structure supporting ODTU2.ts/ODTU3.ts is defined to be derived from the MFAS counter instead of a dedicated OMFI. Thus, in case of the MFS being synchronized, the MFAS remains to be used to derive a multiframe period or a double-use counter as described before can be inserted at frame column #16/frame row *4.

In case that the FS signal is not aligned between the ODU signals transporting bonded OPU payloads, the ODTU payload and TSOH overhead can be correctly mapped into the bonded OPU payloads by determining the required byte positions from the known deskewing counter/OMFI position at column #16/frame row *4 of each individual ODU signal.

As the same value of the deskewing counter is inserted for any individual bonded OPU payload of the aggregate OPU_N payload, the adapted OTN multiplex structure sink function can deskew the received individual bonded OPU payloads. The OTN multiplex structure sink function can delay individual ODU/OPU signals such that the byte positions of the deskewing counter (MFAS or any other byte) with the same counter value are aligned. Thus, even in case that the source function may not have aligned the FS/MFS, at the sink function they are aligned by aligning the counter byte positions.

The definition of an ODTU requiring Mx TS of the aggregate OPU_N payload provided by Nx bonded OPU payloads (ODTUk_N.M) to be transported can be identical to the ITU-T G.709 definition of an ODTU.M requiring Mx TS of an OPU payload.

For example, the definition of an ODTU4_N.M can be identical to the definition of an ODTU4.M, i.e. an ODTU4_N.M frame can be structured in 95 frame rows with 160 frame columns with each position of the frame structure containing M bytes of payload data, wherein M is the amount of Tributary Slots TS bundled to transport the ODTU4_N.M payload data. In a possible implementation, the groups of M bytes of the ODTU4_N.M payload area are numbered from 1 to 15200 (95 frame rows×160 frame columns).

The data of two ODTU4_N.M frame rows (95×M bytes) can be multiplexed/mapped into the bytes allocated to the Mx TS bundled within one frame of a multiframe period, i.e. within one multiframe period of 80 frames, the data of 160× ODTU4_N.M frame rows can be multiplexed/mapped.

In case of other multiframe structures being required to support multiplexing of more than 80× ODTU N.M signals into the aggregated OPU_N payload, the organization of the ODTU_N signals need to be adapted accordingly.

The main difference between an ODTU4_N.M and an ODTU4.M is that in case of the ODTU4_N.M the amount of Tributary Slots TS to bundle (as defined by the value M) may take on values beyond the capacity provided by a single OPU4 payload, i.e. M may range from 1 to Nx 80 instead of 1 to 80.

The definitions of ODTU2_N.M/ODTU3_N.M can be defined in the same way, i.e. being mainly identical to the respective ODTU2.M/ODTU3.M with the difference of supporting Nx the maximum number of Tributary Slots TS provided by the OPU2/OPU3 payloads to be bundled.

The ODTU_N.ts TSOH definition may be chosen to be identical to the ITU-T G.709 definition of an ODTU.ts as well, i.e. it can contain the 6 Justification Control (JC) bytes with the same content as defined for ODTU.ts.

The data of a Lower Order LO ODU signal can be mapped into the ODTU_N.M frame structure the same way ITU-T G.709 defines the data of a LO ODU signal to be mapped into the ODTU.M frame structure. Accordingly, the mapping can be performed by means of a GMP mapping procedure as specified in ITU-T G.709 Annex D.

Groups of M successive bytes of the extended ODU signal can be mapped into a group of M successive bytes of the ODTU_N.M payload area (one position of the ODTU_N frame structure) under control of the GMP data/stuff control mechanism. Each group of M bytes of the ODTU_N.M payload area may either carry Mx LO ODU signal bytes or Mx stuff bytes.

As long as the same multiframe structure is defined for the aggregate OPU_N payload as defined for a single OPU payload, except for the range of $\Sigma C_{8D}$, the server related parameter $f_{Server}$, $T_{server}$, $B_{server}$ and $P_{m,Server}$ for ODTU_N.ts stay the same as the ones applicable for the respective ODTU.ts.

For example, for an aggregate OPU4_2 payload provided by bundling the OPU payloads of 2× ODU4 signals (160×TS available) keeping the 80 frame multiframe structure (i.e. supporting multiplexing of up to 80× ODTU4_2.ts signals), the following situation arises.

The frame period of the server multiframe $T_{Server}$ is 93.416 μs (as the 2× ODU4 signals are transmitted in parallel, the frame period does not change).

The number of bits of an ODTU4_2.ts per server multiframe amounts to ts×8×15200 (scales with the amount of Tributary Slots TS bundled which may now be more than 80).

The ODTU4_2.ts server bit rate $f_{server}$ is as follows:

$$f_{Server}=ts \times 47.5/3824 \times 239/227 \times 99\ 532\ 800\ \text{kbit/s} \pm 20\ \text{ppm}$$

(scales with the amount of Tributary Slots TS bundled which may now be more than 80).

The maximum number of m=8×M bit data entities in the ODTU4_2.ts server payload area, the $P_{m,Server}$ is 15200.

The range of ODTU4.M $\Sigma C_{8D}$ can be 0 to +(M−1).

The $\Sigma C_{nD}$ range coding defined in ITU-T G.709 comprises a 10-bit value, thus not requiring any adaption as may be required for other multiframe structures.

In case of other multiframe structures being defined, the parameters can be adapted accordingly. For example, if a 128 multiframe structure shall be defined for an OPU4_2 signal to support the multiplexing of up to 128× ODTU4_2.ts signals instead of 80, an ODTU4_2.ts can be organized in 95 frame columns and 256 frame rows with the groups of M bytes in the ODTU4_2.M payload being numbered from 1 to 24300.

Care needs to be taken in defining alternative multiframe structures as in such cases, the coding of the GMP process parameter as defined by ITU-T G.709 can no longer support the required value range and hence, defining a differing TSOH structure may become necessary.

For example, in order to code the required value of $C_m$ for the above-mentioned 128 frame multiframe structure, the 14 bit defined for $C_m$ encoding by ITU-T G.709 in the JC#1/JC#2 bytes will be insufficient (maxing out at a value of 16383 but required to cover 24300 now).

Consequently, the structure of the JC bytes content would have to be adapted. In this example, the Increment Indicator (II) and Decrement Indicator (DI) mapped in JC*2 per ITU-T G.709 can be moved to be mapped into 2 of the reserved bits of JC#6, thus making room for a 16-bit value in JC*1/JC*2 to code the $C_m$ values (still protected by a CRC-8 in JC*3).

In total, the amount of bytes required to carry JC*1 to JC*6 would therefore not be changed, however, the way defined parameters are coded and/or transported by means of these 6 bytes would be adapted.

Once the bonded OPU payloads of an aggregate OPU_N payload have been aligned and their order is established, TS bundles allocating tributary slots TS from any bonded OPU payload may be defined to transport the data of an ODTU_N.M signal. To identify bundles of tributary slots TS, it can be beneficial to apply concepts for the Multiplex Structure Identifier MSI as defined by ITU-T G.709. Which concept may be applied can depend on the amount of OPU payloads to be bonded as well as on the maximum amount of ODTU_N.M to be multiplexed.

For example, as long as no more than 80× ODTU4 N.M signals need to be multiplexed into an aggregate OPU4_N payload, it can be beneficial to apply a definition of ITU-T G.709 for an OPU4 MSI with PT=0×21.

Here, PSI[2]... PSI[81] would be allocated for MSI coding where the tributary slot TS occupation bit (bit #1) indicates whether or not a specific tributary slot TS is allocated and the remaining 7 bits are used to define a TS port number (TSP) ranging from 0... 79 in value identifying which tributary slot TS belongs to the same bundle of tributary slots TS.

Hence, a maximum of 80× ODTU4_N.M signals may be multiplexed into the aggregate OPU4 N payload. In such a case, up to 80× TSOH of the ODTU4_N.M may have to be transported thus requiring an 80 frame multiframe period. I.e., the OMFI as defined for the OPU payload of an ODTU4 signal needs to be supported either as defined by ITU-T G.709 or after a modulo 80 operation applied to a 0... 239 deskewing counter if inserted at the byte of the OMFI.

If more than 80 but no more than 128× ODTU4_N.M shall be multiplexed into an aggregate OPU4_N payload, a MSI definition comparable to the one described may be beneficial. PSI[2]... PSI[129] may be allocated for proprietary MSI coding with the same TS occupation and TSP structure, i.e. with a valid TSP range of 0... 127.

In such a case, up to 128× TSOH of ODTU4_N.M may have to be transported requiring a 128 frame multiframe period. To achieve this, either the MFAS may be used to identify the frame position within the multiframe period (if MFS got synchronized) or an adapted 0... 127 OMFI counter can be inserted at the OMFI byte position in the OPU OH.

If more than 128× ODTU4 N.M shall be multiplexed into the bonded OPU4 payloads, 2 bytes per tributary slot TS may be allocated in PSI[2]... PSI[161] for the MSI coding. In such a case, it can be beneficial to use the MSI definition as provided by ITU-T G.709 for the OPUCn MSI but extending the valid value range for the TSP to Nx 80× (instead of Nx 10). In such a way, the structure can provide a 14-bit TSP value range easily covering any sensible amount of TS bundles to be supported. As a consequence of increasing the amount of ODTU4_N.M supported to be mapped/multiplexed and hence changing of the multiframe structure definition as required, other aspects may need to be adapted as well. For example, ODTU4_N.ts signal structure, GMP process parameters and possibly JC byte content has to adapted accordingly.

The same concepts can be applied to bonded OPU payloads provided by ODU2/ODU3 signals. In this case, 8 or 32 ODTU2_N.M/ODTU3_N.M can be multiplexed without having to change the multiframe structure.

A TS bundle can contain any tributary slot TS from any of the bonded OPU payloads of an aggregate OPU_N payload.

To be able to map/multiplex the payload data of the ODTU N.M signals into the TS bundled, the order in which data is written into and/or retrieved from each TS bundle must be defined unambiguously. For ease of technical implementation, it can be beneficial to define the order of TS the same way as ITU-T G.709 standard defines the order of tributary slots TS of the multiple OPUC payloads of an ODUC signal. The tributary slot TS of an aggregate OPU_N payload can thus be identified as TS#A.B, wherein A is the OID assigned to an individual bonded OPU payload a TS belongs to (A=1... N) and B is the TS number within the individual bonded OPU payload (e.g. B=1... 80 for bonded OPU payloads provided by ODU4 signals).

The data of the ODTU_N.M can then be mapped into the bundle of TS in ascending order of A first and ascending order of B second as defined by ITU-T G.709 for OPUCn.

In alternative implementations and embodiments, differing order definitions are possible. For example, B first and A second or descending order, etc. as long as it is a unique order clearly defined for the source and sink functions to access the bundles in the same way.

The partitioning of individual OPU payloads into 1.25G TS does remain unchanged.

For example, for the OPU payloads provided by ODU4 signals, frame columns *3817 through *3824 contain fixed stuff bytes with the remaining 15200 bytes available per frame in the OPU4 payload area providing 190 bytes per TS.

In case of OPU payloads provided by ODU2/ODU3 signals being bundled, no fixed stuff are required with the entire payload area of 15232 bytes being available to carry ODTU2_N.M/ODTU3_N.M payload data.

The actual mapping/multiplexing of the ODTU_N.ts payload data can be in accordance with the respective definitions of ITU-T G.709 of ODTUk.M.

For example, a byte of an ODTU4_N payload signal can be mapped into a byte of TS#A.B of the aggregate OPU4_N payload in the ascending order as described before. Thus, two groups of M bytes from the ODTU4_N.M payload area can be written into the bytes provided by the Mx TS bundled from the aggregate OPU4_N payload per frame of the multiframe period and thus the content of one ODTU4_N.M frame can be written within one multiframe period.

With the procedures defined to map the data of ODTU_N.M into a bundle of TS possibly distributed over bonded OPU payloads, the final steps to cover are the transport of the 6 bytes of ODTU_N.M TSOH containing for instance the GMP mapper process parameter determined while mapping the LO ODU signals into the ODTU_N.M signals. In a possible embodiment, definitions of ITU-T G.709 regarding handling of the ODTUCn.M TSOH for the ODTU_N.M TSOH handling are reused.

The 6 bytes of TSOH associated with the ODTU_N.M can thus be mapped into the ODU signal transporting the bonded OPU payload containing the TS(A,B) allocated as the last one of the TS bundle. Which tributary slot TS is identified as the one allocated last to a bundle depends on the definition of the sorting order. If the beneficial order described before can be applied, the TS allocated last to a bundle would be that TS having the highest value of B first and the highest value of A second.

For example, for a bundle of TS#1.1, TS#2.1 and TS#1.2, the TS allocated last would be TS#1.2.

As only one set of OPU payload OH bytes may be transported per ODU signal frame, a multiframe period needs to be defined providing as many frames as may be required for the maximum amount of TS bundles.

The frame within a multiframe period of ODU signal determined to carry the TSOH can be identified by the value of the multiframe counter (OMFI or any other as applicable to the multiframe period) matching the value of TSP configured for the specific TS bundle.

Although there may be Nx ODU signals transporting the bundled OPU payloads of the aggregate OPU_N payload, it may not be sufficient to provide a multiframe period of the $N^{th}$ part of the maximum amount of TS bundles. This applies at least to the definition of the determination in which ODU4 signal/frame within a multiframe period the TSOH of the ODTU_N.M are inserted.

For example, if a maximum of 80× TS bundles may be supported for an aggregate OPU4_N payload provided by Nx bonded OPU4 payloads, the bundles can be defined in such a way that for each bundle the TS allocated last (defining the ODU4 signal and frame within the 80 frame multiframe period to transport the TSOH) will always be provided by the same bonded OPU4 payload. While in such a use case the OPU payload OH areas of any ODU4 signal other than the one providing that one OPU payload stays unused (i.e. no TSOH is inserted) it would be a valid supported configuration.

The method and apparatus 1 according to the present invention can be used for any Optical Transport Network OTN based on wavelength division multiplexing WDM, in particular DWDM. An OTN digital wrapper used by the OTN network provides complete transparency of client signals in flexible containers. Optical Transport Networks OTN support a wide range of data protocols such as IP Ethernet SONET/SDH or video protocols. The method and apparatus 1 according to the present invention provides a mapping and/or multiplexing scheme allowing to optimize network resources, in particular bandwidth usage. In a possible embodiment, the mapping can comprise a predefined mapping rule MR. In a possible implementation, the mapping rule MR is configurable depending on the use case.

The invention claimed is:

1. A method for efficient utilization of a transport capacity provided by an Optical Transport Network, OTN, the method comprising the steps of:
   mapping client signals comprising Lower Order, LO, Optical Data Units, LO ODUk, into Optical Data Tributary Units, ODTU, each requiring a number of Tributary Slots, TS, of an aggregate OPU_N payload area having a size corresponding to the available aggregated OPU payload areas of Nx independent Higher Order, HO, Optical Data Units, HO ODUk, to be transported;
   multiplexing the Optical Data Tributary Units, ODTU, into the aggregate OPU_N payload area;
   mapping the Tributary Slots, TS, of the aggregate OPU_N payload area into Tributary Slots, TS, provided by the OPU payload areas of the Nx independent Higher Order, HO, Optical Data Units, HO ODUk, according to a predefined mapping rule, MR; and
   further multiplexing the Nx independent Optical Data Units, ODUk, containing the OPU payload areas or transmitting them as Optical Transport Units, OTUk.

2. The method according to claim 1 wherein the Lower Order, LO, Optical Data Units, LO ODUk, are mapped into Optical Data Tributary Units, ODTU, by an asynchronous mapping procedure.

3. The method according to claim 1,
   wherein the predefined mapping rule, MR, indicates a mapping between Tributary Slots, TS, of the aggregate OPU_N payload area and Tributary Slots, TS, provided by the OPU payload area of Nx independent Optical Data Units, ODUk.

4. The method according to claim 3,
   wherein the predefined mapping rule, MR, indicates a mapping as follows:

TS(A,B)↔TS(B)@OTUk(A)

wherein A is an OPU payload identifier, OID, identifying the OPU payload of an individual Optical Data Unit, ODUk, from a set of available Optical Data Units, ODUk, and B is a Tributary Slot, TS, number of an available Tributary S lot, TS, provided by the OPU payload of the individual Optical Data Unit, ODUk.

5. A method for efficient utilization of a transport capacity provided by an Optical Transport Network, OTN, the method comprising the steps of:
   extracting OPU payload areas of Nx independent Optical Data Units, ODUk;
   deskewing the extracted OPU payload areas of the Nx independent Optical Data Units, ODUk, to compensate differential transport delays;
   demapping of Tributary Slots, TS, of an aggregate OPU_N payload area from the Tributary Slots, TS, provided by the deskewed OPU payload areas of the Nx independent Optical Data Units, ODUk;
   demultiplexing of Optical Data Tributary Units, ODTU, from the aggregate OPU_N payload area; and
   demapping Lower Order, LO, Optical Data Units, LO ODUk, transmitted as client signals from the Optical Data Tributary Units, ODTU.

6. The method according to claim 5 wherein the deskewing of the extracted OPU payload areas of the Nx independent Optical Data Units, ODUk, is performed by using a round robin deskewing counter.

7. The method according to claim 6 wherein the round robin deskewing counter comprises an MFAS counter or an OPU payload alignment counter generating a counter value transported in the OPU overhead (OH).

8. An Optical Transport Network, OTN, apparatus comprising:
   a first mapping unit adapted to map client signals comprising Lower Order, LO, Optical Data Units, LO ODUk, into Optical Data Tributary Units, ODTU, associated with a number of Tributary Slots, TS, of an aggregate OPU_N payload area having a size corresponding to available aggregated OPU payload areas of multiple, N, independent Higher Order, HO, Optical Data Units, HO ODUk, to be transported;
   a multiplexing unit adapted to multiplex the Optical Data Tributary Units, ODTU, into the aggregate OPU_N payload area;
   a second mapping unit adapted to map the Tributary Slots, TS, of the aggregate OPU_N payload area (4) into Tributary Slots, TS, provided by the OPU payload areas of the multiple, N, independent Higher Order, HO, Optical Data Units, HO ODUk, according to a predefined mapping rule, MR;
   wherein the multiple, N, independent Optical Data Units, ODUk, are either further multiplexed by said multiplexing unit or transmitted as Optical Transport Units, OTUk.

9. The Optical Transport Network, OTN, apparatus according to claim 8, further comprising
   an extraction and deskewing unit adapted to extract OPU payload areas of multiple, N, independent Optical Data Units, ODUk, and to deskew the extracted OPU payload areas of the multiple, N, independent Optical Data Units, ODUk, to compensate differential transport delays.

10. The Optical Transport Network, OTN, apparatus according to claim 9 comprising
    a first demapping unit adapted to demap Tributary Slots, TS, of an aggregate OPU_N payload area from the Tributary Slots, TS, provided by the deskewed OPU payload areas of the multiple, N, independent Optical Data Units, ODUk.

11. The Optical Transport Network, OTN, apparatus according to claim 10 comprising
a demultiplexing unit adapted to demultiplex the Optical Data Tributary Units, ODTU, from the aggregate OPU_N payload area.

12. The Optical Transport Network, OTN, apparatus according to claim 11 comprising
a second demapping unit adapted to demap Lower Order, LO, Optical Data Units, LO ODUk, forming client signals from the Optical Data Tributary Units, ODTU.

13. The Optical Transport Network, OTN, apparatus according to claim 9,
wherein the extraction and deskewing unit is adapted to deskew the extracted OPU payload areas of the multiple, N, independent Optical Data Units, ODUk, using a round robin deskewing counter.

14. The Optical Transport Network, OTN, apparatus according to claim 9,
wherein the round robin deskewing counter comprises an MFAS counter or an OPU payload alignment counter generating a counter value transported in the OPU overhead.

* * * * *